United States Patent [19]
Welton et al.

[11] 4,058,757
[45] Nov. 15, 1977

[54] WELL PUMP-OFF CONTROLLER

[75] Inventors: Barry S. Welton; Granval W. Westerman; Michael E. Hill, all of Midland, Tex.

[73] Assignee: End Devices, Inc., Midland, Tex.

[21] Appl. No.: 678,452

[22] Filed: Apr. 19, 1976

[51] Int. Cl.² ........................................... G05B 5/00
[52] U.S. Cl. ............................... 318/474; 73/133 R; 73/151
[58] Field of Search ............... 73/151, 133R; 318/474, 318/476; 417/1

[56] References Cited
U.S. PATENT DOCUMENTS

| | | | |
|---|---|---|---|
| 3,440,512 | 4/1969 | Hubby | 318/474 |
| 3,817,094 | 6/1974 | Montgomery et al. | 73/151 |
| 3,953,777 | 4/1976 | McKee | 318/474 |

Primary Examiner—Jerry W. Myracle
Attorney, Agent, or Firm—Wofford, Felsman, Fails & Zobal

[57] ABSTRACT

A system for measuring current or load for shutting down a motor of a walking beam type pumping unit in the event that pump-off occurs. The system employs a peak picker which picks either minimum current or maximum load and an integrator coupled to the peak picker for integrating current or load during each stroke cycle. A threshold device coupled to the output of the integrator produces a control signal for shutting down the motor if the integrator output fails to reach a predetermined threshold during each stroke cycle.

4 Claims, 16 Drawing Figures

Fig. 3    CURRENT WAVEFORM

Fig. 4    PEAK DETECTOR

Fig. 5    MONOSTABLE

Fig. 6    INTEGRATOR RESET

Fig. 7    INTEGRATOR

Fig. 8    TIME DELAY RESET

Fig. 9    TIME DELAY CHARGE

Fig. 10    WELL SHUT DOWN

WELL PUMP-OFF CONTROLLER

SUMMARY OF THE INVENTION

The present invention is directed to a new and improved system for controlling an electric motor employed for driving a walking beam type pumping unit and which is employed to shut the motor down if, for example, conditions such as pumpoff occur. This system may be used either with a measuring means for measuring minimum current drawn by the motor or with a measuring means for measuring load of the pumping unit.

The current drawn by the motor normally has two minimum peaks during each stroke cycle of the walking beam. In the embodiment where current is to be measured, the measuring means is of the type which measures the amplitude of the current drawn by the motor during each stroke cycle of the walking beam. Detector means is coupled to the output of the measuring means for producing a pulse at the minimum peaks of the current amplitude during each stroke cycle. Integrator means is provided which has a first input coupled to the output of said measuring means for integrating the current measured by said measuring means during each stroke cycle. Pulse generating means is coupled to the output of said detector means and is responsive to alternate pulses from said detector means for generating a control pulse during each stroke cycle having a time period greater than ½ of the time period of each stroke cycle. The integrator means has a reset input. Means is provided for applying the output of said detector means to said reset input. In addition, means is provided for applying the output of said pulse generator means to said reset input to allow only alternate ones of said pulses from said detector means to reset said integrator means to allow said integrator means to integrate the current amplitude over the complete cycle of each stroke. In addition, there is provided means including threshold means for sensing the output of said integrator means during each stroke cycle and for producing a control signal for shutting off the motor if the integrator output fails to reach a predetermined threshold during each stroke cycle representative of normal pumping conditions.

The detector means comprises capacitor means for storing the previous minimum value of the output of said measuring means and means coupled to the output of said measuring means and to said capacitor means for applying a charge to said capacitor means if the minimum value of current decreases to a lower value than the previous minimum value. Means is also provided for applying the value of the charge stored in the said capacitor means to a reference input of said integrator means to allow said integrator means to employ the value of the charge stored in said capacitor means as a base from which integration is carried out.

In the embodiment where load is measured, there is provided a measuring means for measuring the amplitude of the load of the pumping unit during each stroke cycle of the walking beam. A detector means produces a pulse at the maximum peak of the load amplitude during each stroke cycle. Storage means stores a value representative of peak load and a reference means sets a reference level at a predetermined value below the peak load stored by the storage means. An integrator means has an input coupled to the output of the measuring means. A control means is provided which is responsive to the output of the measuring means for allowing the integrator means to integrate the load measured by the measuring means only when it is below the reference level. Pulse generating means is coupled to the output of said detector means and responsive to pulses from said detector means for generating a control pulse during each stroke cycle having a time period greater than ½ of the time period of the stroke cycle. The integrator means has a reset input and means is provided for applying the output of the detector means to the reset input. In addition, means is provided for applying the output of the pulse generator to the reset input to allow only said pulses from said detector means to reset said integrator means to allow said integrator means to integrate during each stroke cycle. There is also provided means including threshold means for sensing the output of the integrator means during each stroke cycle for producing a control signal for shutting off the motor if the integrator output fails to reach a predetermined threshold during each stroke cycle representative of normal pumping conditions.

In the embodiment wherein load is measured, the detector means comprises capacitor means for storing the maximum value of the output of the measuring means. Means is coupled to the output of the measuring means and to said capacitor means for applying a charge to said capacitor means if the maximum value of the load increases to a higher value than the previous maximum value.

DETAILED DESCRIPTION OF THE INVENTION

Figure 1:
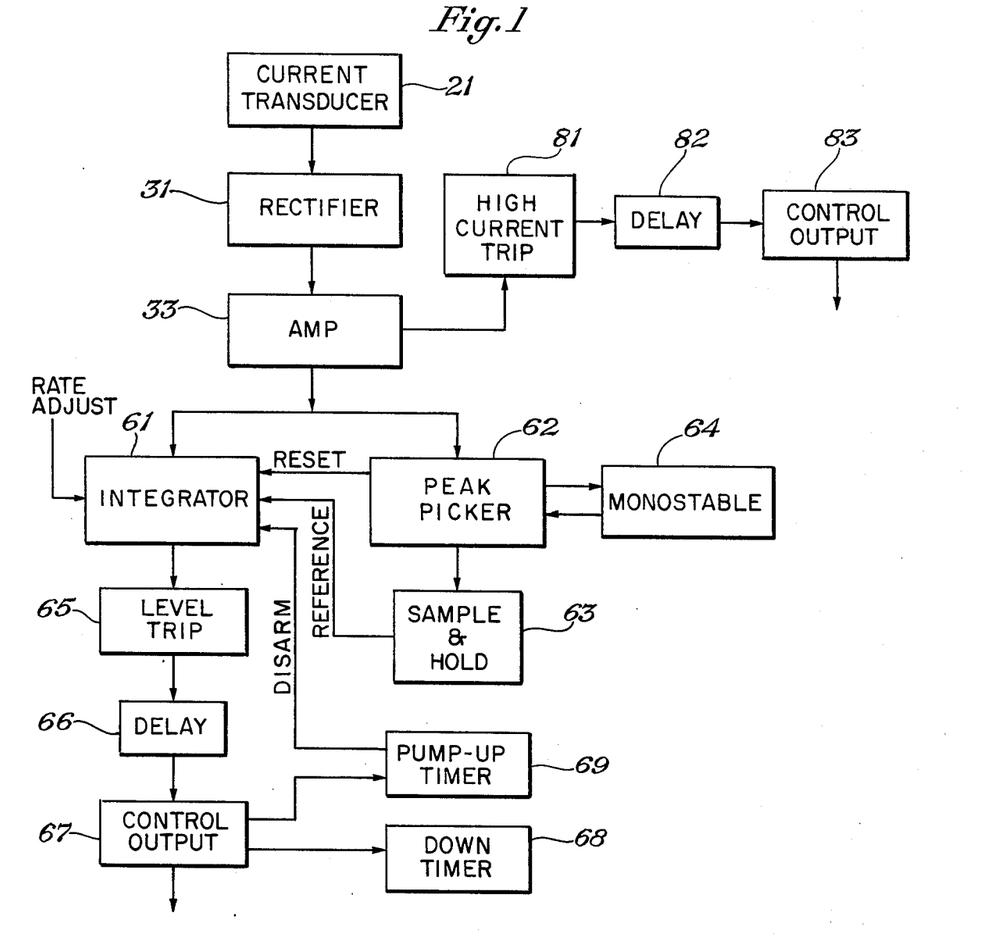
FIG. 1 is a block diagram of one embodiment of the present invention which measures current drawn by the motor of a walking beam type pumping unit for controlling the pumping unit.
Figure 2A:
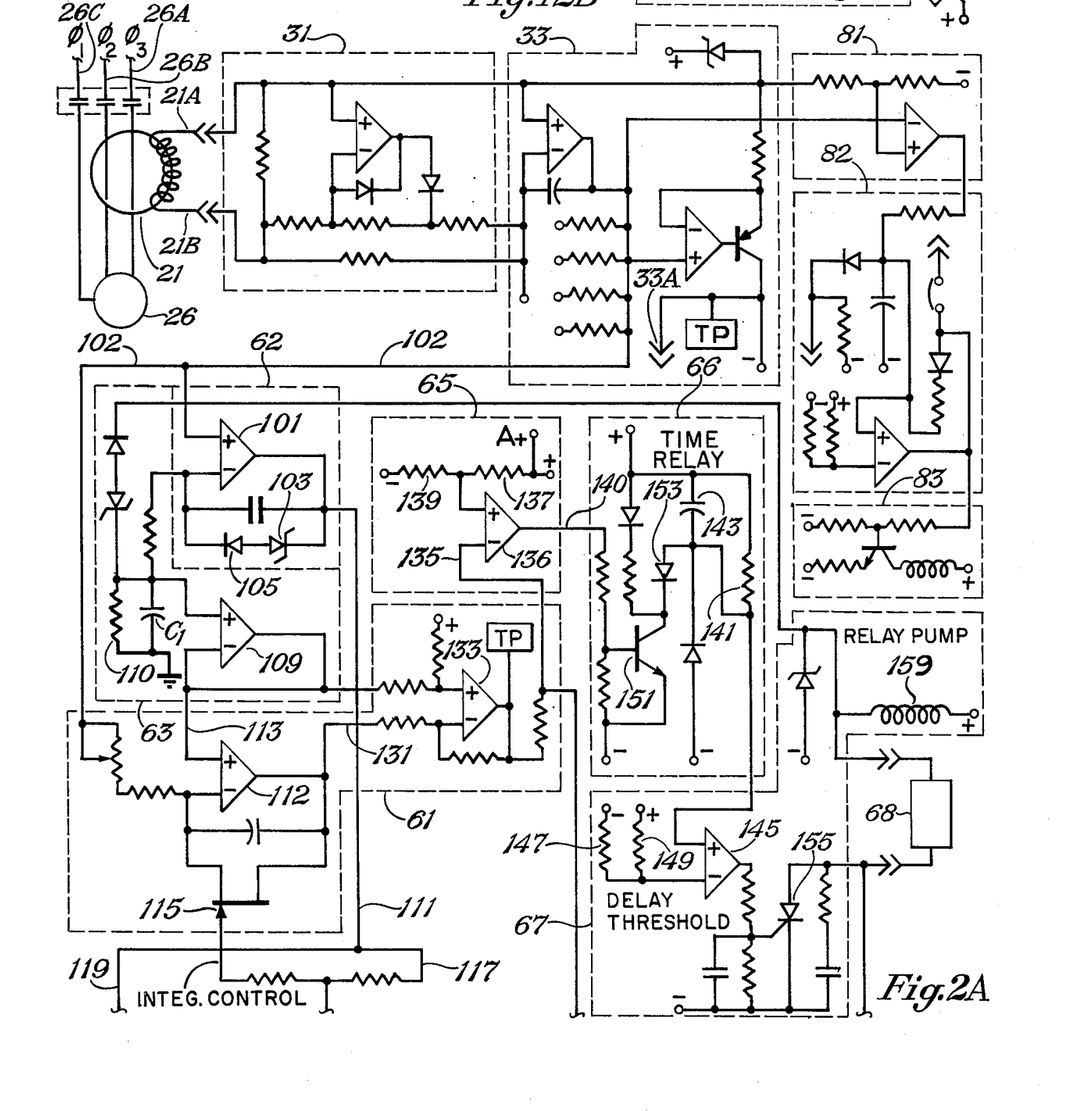
FIGS. 2A and 2B are an electrical schematic of the block diagram of FIG. 1. The bottom of FIG. 2A fits to the top of FIG. 2B.
Figure 2B:
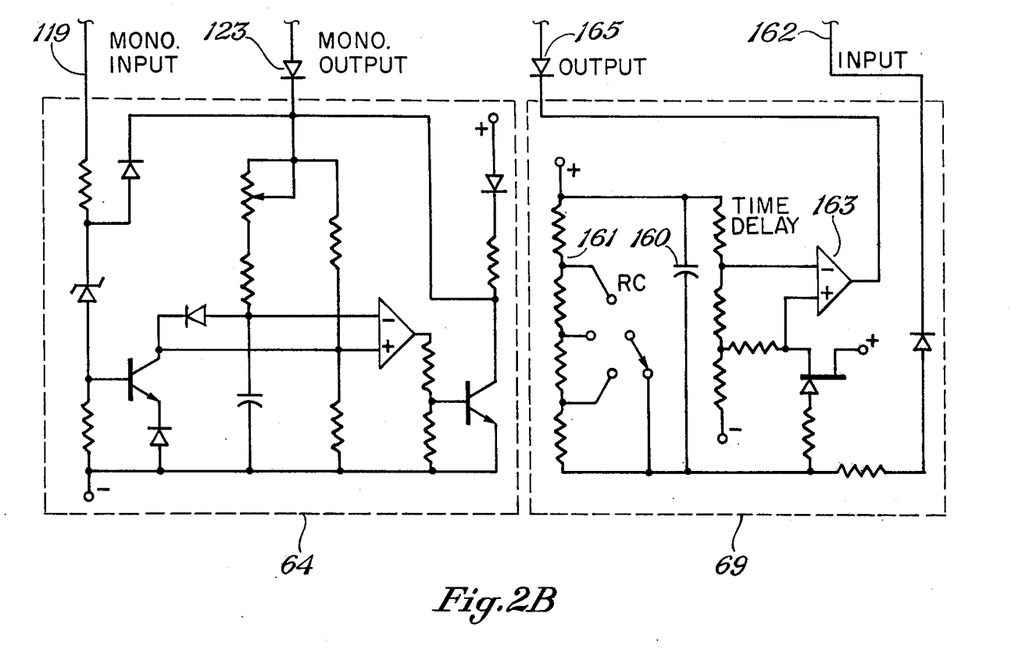

Referring now to the embodiment of FIGS. 1-10, there is disclosed in FIGS. 1, 2A and 2B a current transducer 21 for measuring the current drawn by an electrical motor 26 employed for driving a walking beam type pumping unit for pumping fluid from a well. Reference is made to U.S. Pat. No. 3,817,094 for a brief description and drawing of such a pumping unit for pumping oil from a well which extends from the earth surface into a subterranean oil producing formation. The motor in FIG. 1 of the present application is a three phase motor having three electrical leads 26A, 26B and 26C extending thereto from a source of AC voltage (not shown). The transducer 21 is a circular member comprising a transformer which encircles two of the leads 26A and 26B for measuring current drawn by the motor. The transducer produces a voltage representative of the current measured. Leads 21A and 21B extend from the transducer and are connected to a rectifier 31, the output of which is connected to an amplifier 33 which filters and amplifies the signal to produce at test point 33A of FIG. 2A, the waveform 41 of FIG. 3 which is representative of current.

The voltage applied to the motor is 60 cycle AC whereby the output of the transducer is a 60 cycle modulated amplitude signal. The amplitude is modulated due to the current demand of the motor. During the pumping cycle, as the motor starts straining harger, it starts drawing more current and the peak value of the output of the transducer increases. This occurs twice, during the upstroke and downstroke, for each complete stroke cycle of the walking beam. As the current demand of the motor decreases, the amplitude decreases. This occurs twice, at the top of the stroke and at the bottom of the stroke, for each complete stroke cycle of the walking beam. At these points of the stroke cycle of the walking beam, the demand on the motor is at its minimum value.

The present system operates on the rectified envelope of the amplitude modulated signal. This is obtained by rectifying the signal with rectifier 31 and filtering and amplifying the rectified signal with the amplifier 33 to obtain the waveform 41 of FIG. 3. In this Figure, a complete stroke cycle extends between lines 43 and 45. This cycle may be defined as a normal pumping cycle wherein the pump is operating normally. Its period may be 6 seconds whereby the pump is operated at 10 strokes per minute. Maximum peaks 47 and 49 represent the downstroke and upstroke respectively of the walking beam. Minimum peaks 51 and 53 represent the top and bottom respectively of the strokes of the walking beam.

The present system integrates the area under the curve 41 for each stroke cycle and employs that area as a basis to determine if the well is pumping normally. The system picks the minimum current peaks during each stroke cycle and employs the minimum current as a base or reference from which integration is carried out. Minimum current is employed as a base since it is more stable than maximum current. If the well begins to pump off the maximum peak of the downstroke begins to decrease as seen to the right of the waveform 41 in FIG. 3. The upstroke peak remains fairly constant during pump off whereas the downstroke peak begins to decrease. Thus, during pump off, the integrated area begins to decrease at which time the system sends out a stop command to shut the well down. The circuitry for performing these functions is identified at 61-69.

Circuitry identified at 81-83 comprises malfunction circuitry which looks at the peak value of the current amplified output from the amplifier 33. If the peak value exceeds a certain threshold for a preset period of time, it shuts the motor down to prevent it from burning up which may otherwise occur if power demand becomes too great. The high current trip 81 detects the current peak value to determine whether the output is greater than the threshold level. It is looking for a sustained peak above the threshold and if it finds that this occurs, it produces an output. The output drives the delay circuit 82 which times how long that condition can be tolerated before it is required to shut the well down. Typically this period is around 3 seconds. If the condition continues beyond that period, the delay circuit 82 actuates a control output circuit 83 which shuts the well down. The delay circuit 82 is a RC timing circuit which inputs to a threshold detector. The threshold detector is set such that if it times for more than 3 seconds, a threshold value will be exceeded at which time it produces an output for actuating the control output circuitry 83 for shutting the well down.

Figure 4:
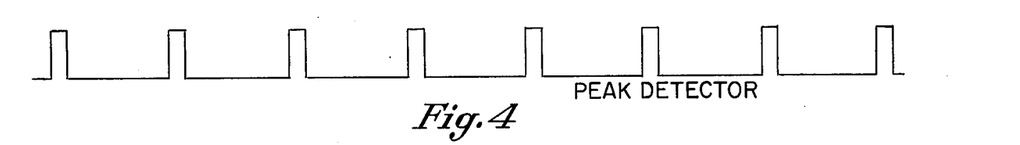
Figure 5:
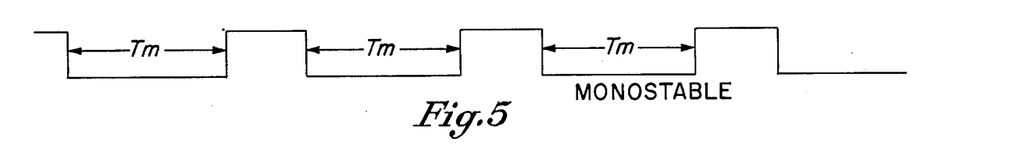

Referring now to FIGS. 1 and 3-10, the circuitry 61-69 basically comprises an integrator 61 which integrates the output of the amplifier 33 during each stroke cycle and a peak picker 62, a sample and hold circuit 63, and a monostable multivibrator 64 which together act to control the integrator. Also included is a level trip 65, a delay 66, and a control circuit 67 which are actuated if the output from the integrator 61 fails to reach a preset threshold, to shut down the motor. The peak picker 62 picks the minimum peaks and the sample and hold circuitry 63 holds the last minimum peak detected. Any time the motor current approaches that peak again, the peak picker looks at it and if it is less than the minimum value held by the sample and hold circuit, it adjusts and lowers the minimum value in the sample and hold circuit. The minimum value held by the sample and hold circuit is applied to integrator 61 and used as a reference from which integration is carried out. At each minimum current value, the peak picker produces a pulse as seen in FIG. 4. These pulses occur when the walking beam is at the top and bottom of each stroke. They are applied to trigger the monostable multivibrator 64 and also are applied to the integrator 61. The output waveform of the monostable multivibrator is a negative pulse shown at Tm in FIG. 5 which has a time period greater than ½ of the stroke cycle of the walking beam pump unit. This waveform is employed to mask out alternate peaks from the peak picker thereby resulting in the peaks of FIG. 6 which are applied to the integrator 61 to reset the integrator at the end of each stroke cycle. Thus, the integrator integrates the output of the amplifier 33 over a complete cycle of the walking beam which includes both the upstroke and downstroke.

Figure 7:
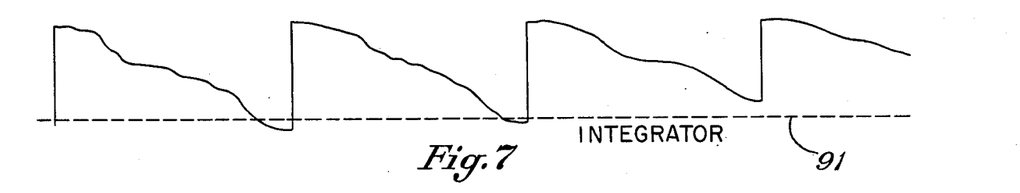
Figure 8:
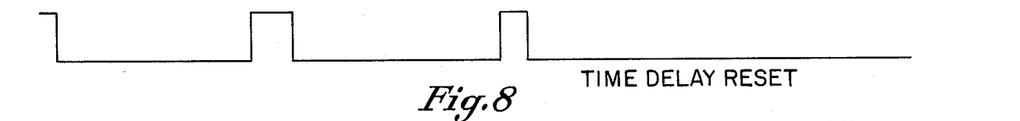
Figure 9:
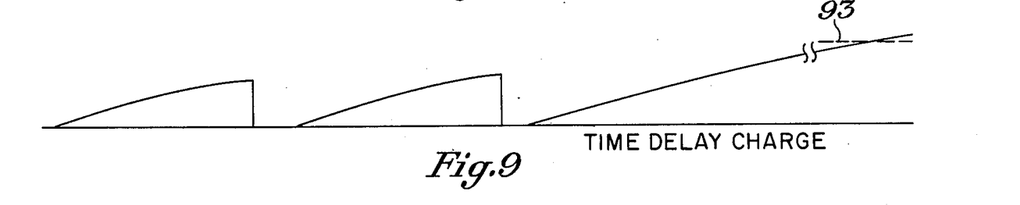
Figure 10:
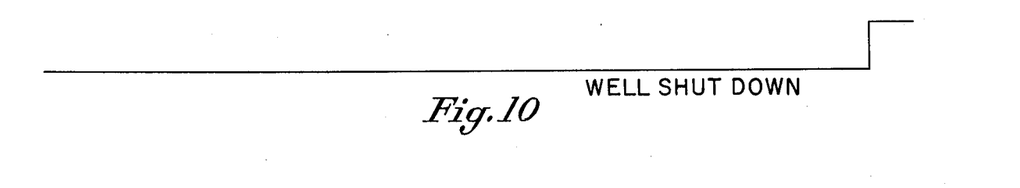

The inverted output of the integrator is shown in FIG. 7. Each curve in this Figure represents the total area under two peaks of the curve of FIG. 3 for a given cycle. Thus, when pump off occurs and the current amplitude of the curve of FIG. 3 decreases, so does the integrated area of the curve of FIG. 7. When the pump is operating normally, the inverted output of the integrator will extend beyond a threshold set by the level trip 65. The threshold is shown in 91 at FIG. 7. When pump off occurs, the inverted output of the integrator decreases and does not reach the threshold as seen on the right in FIG. 7. When the inverted output of the integrator extends beyond the threshold, the level trip 65 produces a positive pulse as shown in FIG. 8. These positive pulses reset a timing circuit 66 to prevent it from charging too high, thereby rendering the control circuit 67 inactive to allow the motor to continue operating. The output of the timing circuit 66 is shown in FIG. 9 while the output of the control circuit is shown in FIG. 10. When the inverted output of the integrator does not reach the threshold set by the level trip 65, positive pulses are not produced by the level trip thereby allowing the timing circuit 66 to charge to a level above a preset threshold shown at 93 in FIG. 9. When this occurs, control circuit 67 produces an output pulse to shut down the motor.

Referring now to FIG. 2A, the peak picker 62 comprises an operational amplifier 101 having its noninverting input connected to the output of the amplifier 33 by way of conductor 102. The signal taken from the amplifier 33 by conductor 102 is inverted from that shown in FIG. 3 whereby the peak picker 62 picks peak voltage which is representative of minimum current. The output of the operational amplifier 101 is connected by way of the diodes 103 and 105 back to the inverting input and to a capacitor C1. This capacitor stores the peak voltage picked and hence minimum current. Diode 103 is a zener diode while diode 105 is reversed biased when the output of amplifier 101 is low. If the voltage on the noninverting input of amplifier 101 is greater than the voltage on its inverting input, the output of the amplifier is high causing the diode 105 to be forward biased. If the current is above minimum current, the voltage on the noninverting input of the amplifier 101 is less than the voltage on the inverting input whereby the output of the amplifier 101 is low. As the current approaches minimum current, the voltage applied to the noninverting input of the amplifier 101 goes up. As minimum current is reached, the voltage on the noninverting input of amplifier 101 becomes greater than the voltage on its inverting input and the output of the amplifier 101 goes high. This causes the diode 105 to be forward biased and allows the capacitor C1 to be charged to a new level representative of the new minimum current. The capacitor C1 is charged until its charge is equal to the voltage on the noninverting input of the amplifier 101. As the current again increases, the voltage on the noninverting input of the amplifier 101 decreases and the output of the amplifier 101 goes low. This casues the diode 105 to be reversed biased and allows the capacitor C1 to hold its charge representative of the new minimum current. If the next minimum current peak does not decrease below the value held by the capacitor C1, the output of the amplifier 101 remains low thereby reverse biasing diode 105 and hence allowing the capacitor C1 to continue to hold its charge representative of the last minimum current.

Operational amplifier 109 is employed as a high impedance buffer to prevent the capacitor C1 from discharging too fast. Resistor 110 causes C1 to discharge slightly during the stroke such that the value present on C1, at the next minimum current, is representative of current somewhat greater than the last minimum. The net effect is to cause the peak picker to detect and establish a new minimum at each minimum current value of the motor. With this arrangement and manner of operation, the peak picker produces a pulse at each minimum value of the current. These pulses are shown in FIG. 4 and are applied by way of conductor 111 to the integrator 61 and to the monostable multivibrators 64.

Figure 6:
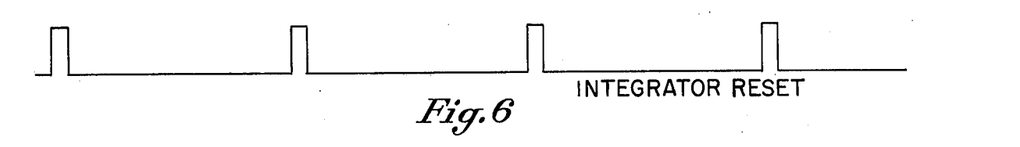

The integrator 61 comprises an operational amplifier 112 having its inverting input connected to the output of the amplifier 33 by way of the conductor 102 and its noninverting input connected to the output of operational amplifier 109 by way of conductor 113 and which output is representative of the charge stored on the capacitor C1 and hence representative of the minimum current value. The output from operational amplifier 109 is employed as a reference from which integration is carried out whereby the minimum current sets the level of the base for integration of the current from the amplifier 33. The integrator 61 also has a control input 115 comprising a FET. The output of the operational amplifier 101 is connected to the control input by way of conductors 111 and 117 and to the input of the monostable multivibrator by way of conductor 119. The pulses on the conductor 111 cause the monostable multivibrator to be actuated to produce the negative going timing pulses shown in FIG. 5. As indicated previously, the time period of these pulses is greater than ½ of the stroke of the walking beam pumping unit. The output from the multivibrator is applied to the input 115 of the integrator 61 by way of diode 123. Since the timing pulses produced by the multivibrator are negative, if the monostable multivibrator is in its timing state, the positive output pulse of the peak picker occuring at that time is masked or overridden by the monostable multivibrator output. Thus, alternate ones of the pulses from the peak picker will be masked out by the negative timing pulses from the multivibrator. When the monostable multivibrator is not in its timing state the positive pulses from the peak picker are not affected by the output of the monostable multivibrator and hence are applied to the integrator control 115 and reset the integrator. Thus, the integrator is able to integrate the output from the amplifier 33 during each full stroke and is reset at the end of each stroke by alternate peaks from the peak picker as shown in FIG. 6. As indicated above, the value of the integrator output at any time during a stroke cycle is representative of the amount of area under the curve 41 that has been accumulated up to that point in time.

The output of the operational amplifier 112 is applied by way of conductor 131 to another operational amplifier 133 which inverts the integrated output from the operational amplifier 112 to produce the waveform of FIG. 7. The circuit is adjusted and calabrated such that when the well is pumping normally, the inverted integrator output reaches the threshold 91 during each stroke cycle. If the well pumps off, the integrated area decreases until the integrated output no longer reaches the threshold. The inverted output of the integrator 61 is applied by way of conductor 135 to the inverting input of an operational amplifier 136 of the level trip circuitry 65. The threshold 91 is set by a voltage divider formed by resistors 137 and 139 which are coupled to the noninverting input of operational amplifier 136. If the signal applied to the inverting input of operational amplifier 136 extends beyond the threshold 91, the output of the operational amplifier 136 goes high and stays high for the duration of the time that the inverted output of the integrator 61 remains beyond the threshold 91 to produce the positive pulses of FIG. 8. If the signal applied to the inverting input of operational amplifier 136 does not reach the threshold 91, the output of operational amplifier 136 remains low as seen to the right of the waveform of FIG. 8.

The output of the operational amplifier 136 is applied by way of conductor 140 to the delay circuit 66 which comprises a RC timing circuit which includes a resistor 141 and a capacitor 143.

The output of the RC circuit is applied to the noninverting input of an operational amplifier 145 of the control system 67. A voltage divider comprising resistors 147 and 149 is coupled to the inverting input of the operational amplifier 145 which set the threshold shown at 93 in FIG. 9. The RC timing circuit is always timing but is reset by the pulses of FIG. 8 once each stroke cycle if the well is pumping normally whereby its output never reaches the threshold 93. Reset occurs by turning on normally off transistor 151 which discharges the capacitor 143 to ground through diode 153 and the transistor 151. If pump off occurs, the pulses of FIG. 8 are not produced and the RC timing circuit is not reset whereby its output reaches the delay threshold 93 to cause operational amplifier 145 to produce a positive pulse shown in FIG. 10. This pulse turns on SCR 155 which causes transistor switch 157 of the downtimer 68 to turn on and energize the relay 159. This relay operates a control mechanism which opens the contactors of the motor to shut it down. The downtimer 68 is a timing circuit which is actuated when the SCR turns on and starts to time for a preset period. After it times out, it turns off transistor 157, and hence renders the SCR nonconductive and de-energizes the relay 159 to restart the pump. The SCR will not conduct again until another positive pulse is applied to its gate from amplifier 145.

Figure 2C:
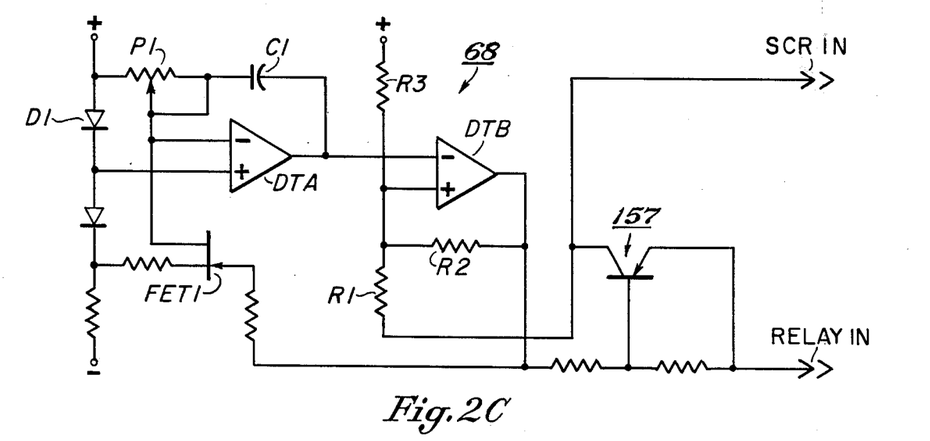
FIG. 2C is a schematic diagram of the downtimer of the system of FIG. 1.
Figure 3:
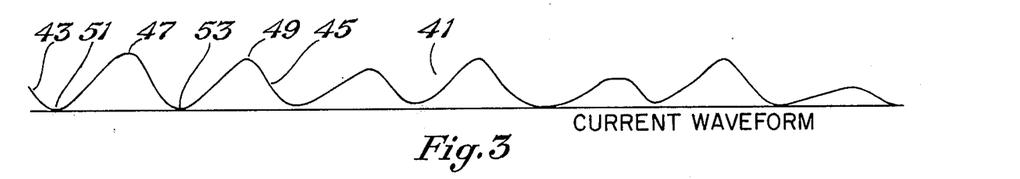
FIGS. 3-10 are curves useful in understanding the system of FIGS. 1 and 2.

Referring also to FIG. 2C, the downtimer 68 operates as follows. In normal static condition the output of DTA is high because FET1 is conducting causing the inverting input of DTA to be held at a lower potential than the noninverting input. The output of DTB is also high causing transistor 157 to be shut off. DTB is high because with the SCR input high and the DTB output high the voltage on DTB's noninverting input is above the voltage on the inverting input. To activate the downtimer, the SCR input is taken to ground which lowers the potential and DTB's noninverting input below the inverting input because of the voltage divider relationship of R1, R3 and R2. With DTB low, transistor 157 turns on the FET1 shuts off. When FET1 shuts off, DTB begins to integrate down because of the 0.5 volts difference in the inputs provided by diode D1. The integration rate is adjusted by changing the resistance of P1 which changes the RC relationship of P1 and C1. The output of DTB being low reduces the potential on the noninverting input of DTB since current flow in R2 must also pass through R3 thus creating a greater voltage drop across R3. When DTA's output goes below the potential on the noninverting input of DTB, the output of DTB goes high. This turns off transistor 157 to stop current flow in the SCR. Also RET1 conducts again to reset the integrator (DTA). With everything reset the clock awaits a low on the SCR input again before initiating another timing cycle.

The pump up timer 69 is a RC timing circuit which effectively disarms the delay circuit 66 and the control circuit 67 for a preset period of time after the pump is restarted to allow the well to reach a normal pumping operation. The RC circuit of the pump up timer comprises capacitor 160 and a selected one of the resistors 161. It is energized by the shut down command applied thereto by way of conductor 162. When the RC timing circuit of the pump up timer 69 provides a voltage on the noninverting input of amplifier 163 that is below the threshold set on the inverting input of the operational amplifier 163, amplifier 163 produces a low output which is applied by way of diode 165 to the output of the integrator 61. It essentially makes the circuit think the integrator 61 is seeing enough area to maintain its output beyond the threshold 91. In otherwords, the output of the operational amplifier 163 keeps the output of the integrator 61 pulled down for a certain period of time whereby the control system 67 cannot shut the well down during the pump up time. The time set is such that after the pump up timer times out, the normal pumping condition provides sufficient area on each stroke to be accumulated by the integrator 61 to allow the pump to continue operating.

In one other aspect, the resistor 137 of the level trip circuit 65 is connected to A+ which is the unregulated voltage supply. With this arrangement, if the voltage fluctuates, the threshold 91 is changed thereby compensating for voltage fluctuation which causes motor current fluctuations. For example, if the voltage goes up, the current will go down if the work done by the pumping unit remains the same. If the current goes down, the inverted output of the integrator 61 will not go as low. As discussed previously, resistor 137 along with resistor 139 form a voltage divider which in turn forms the threshold 91 of the operational amplifier 136. By connecting the resistor 137 to the unregulated voltage supply, the threshold 91 will be raised if the voltage goes up to compensate for the voltage fluctuations and hence the current fluctuations.

Figure 11:
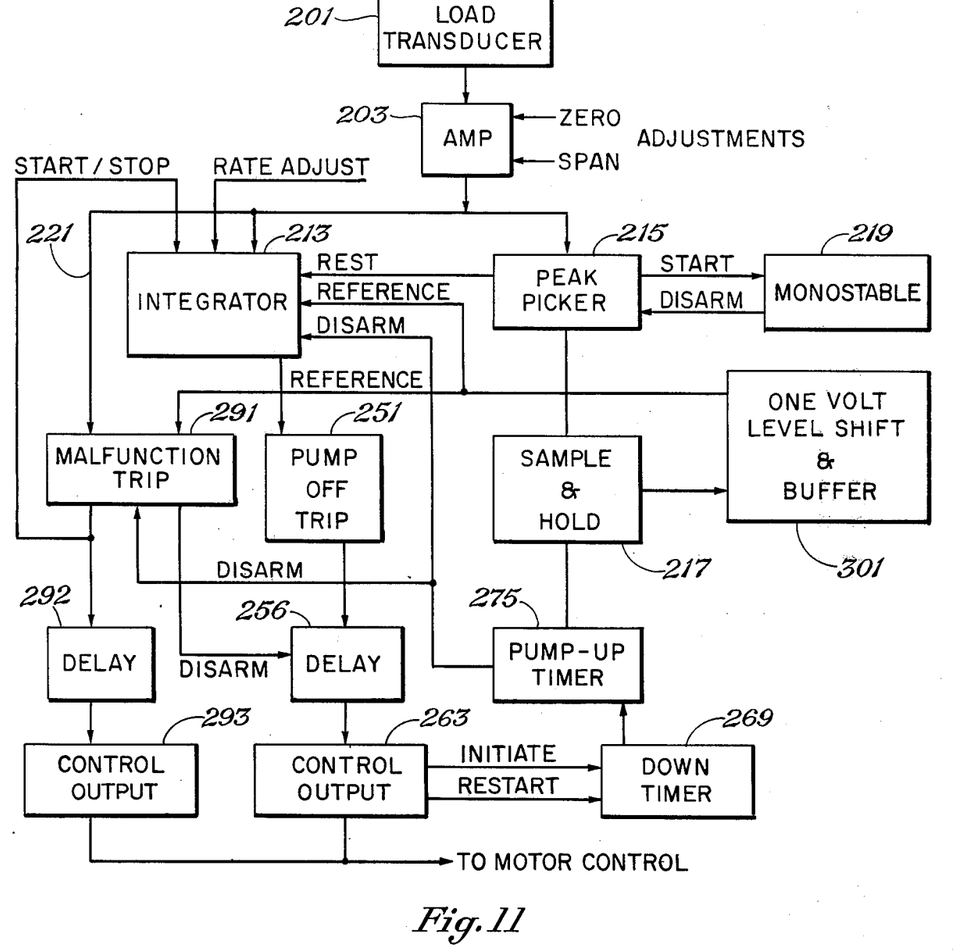
FIG. 11 is a block diagram of another embodiment of the present invention which measures the load of a walking beam type pumping unit for controlling the pumping unit.
Figure 12A:
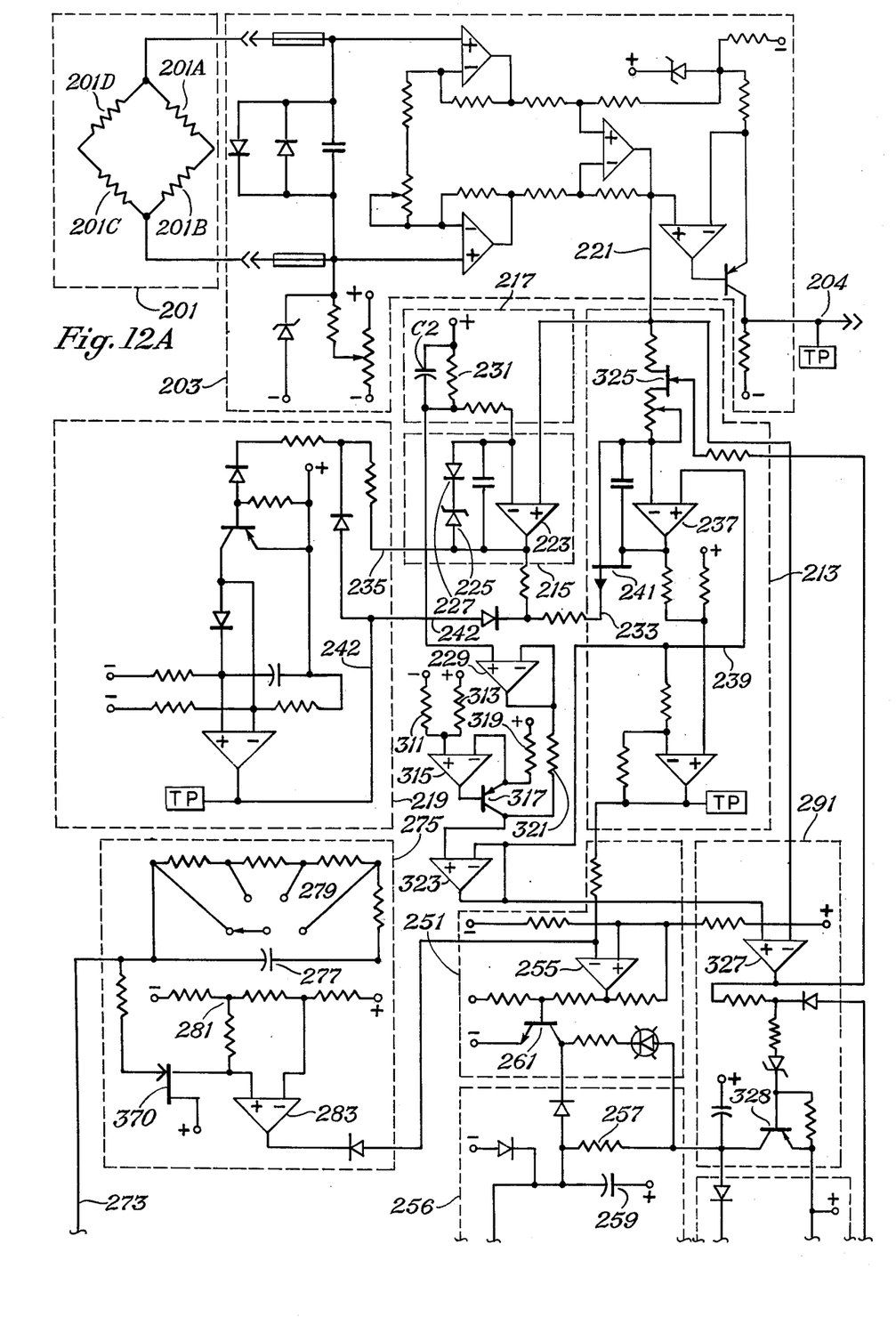
FIGS. 12A and 12B are an electrical schematic of the system of FIG. 11. The bottom of 12A fits to the top of FIG. 12B.
Figure 13:
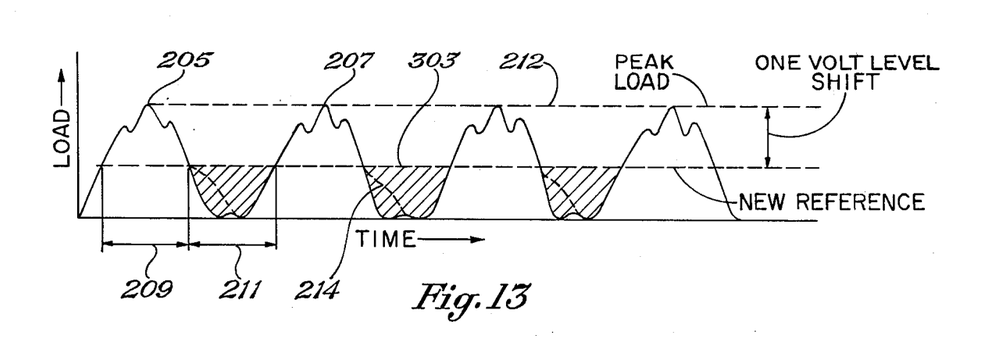
FIG. 13 is a curve useful in understanding the system of FIGS. 11 and 12.

Referring now to the embodiments of FIGS. 11–13, the system shown includes a load transducer 201 connected to the walking beam in a manner similar to that disclosed in U.S. Pat. No. 3,817,094 for measuring load on the beam which is an indication of the load on the polish rod. The load transducer 201 actually comprises four strain gages 201A, 201B, 201C and 201D which form a Wheat stone bridge, the output of which is connected to an amplifier 203. The waveform shown in FIG. 13 is that taken from amplifier 203 at the test point 204 of FIG. 12A. In FIG. 13, a complete stroke cycle occurs between peaks 205 and 207. In most cases, one peak load is produced during each cycle, however, some wells may have more than one peak. In FIG. 13, the upstroke occurs during time 209 above line 303 and the downstroke occurs during time 211 below line 303. Peak load is defined by dotted line 212. The smaller peaks on opposite sides of peak 205 are secondary peaks. If pump off occurs, the waveform of FIG. 13 on the downstroke may follow the dotted curves 214.

Figure 12B:
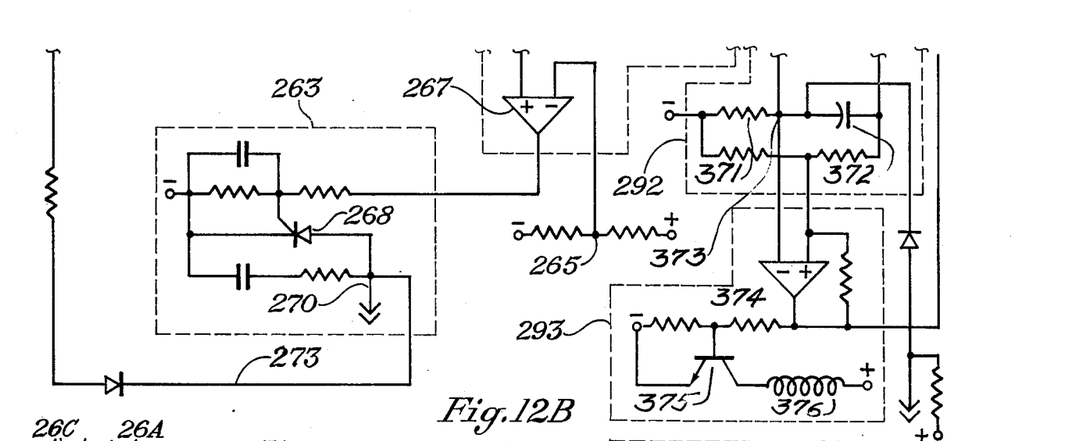

The system of FIGS. 11–13 comprises an integrator 213, a peak picker 215, a sample and hold circuit 217, a one volt level shifter and buffer 301, a monostable multivibrator 219 and a malfunction trip 291. A voltage inverted from that of the waveform of FIG. 13 is applied to the integrator 213 and to the peak picker 215 by way of conductor 221. In operation, the peak picker picks the minimum peaks of this voltage which are the positive peaks of the waveform of FIG. 13 and hence peak load. The minimum voltage picked is stored on capacitor C2 of the sample and hold circuit 217 and is representative of peak load 212.

The amplifier 203 is adjusted such that normally the difference between minimum and peak load is about two volts. The one volt level shifter 301 provides a reference level, which is one volt below the peak which is being held by the sample and hold circuit 217. This one volt level shift reference is identified at 303 in FIG. 13. It is provided to the integrator 213 as a reference for integration and to the malfunction trip circuit 291. The input to the malfunction trip circuit is provided from the amplifier 203. The malfunction trip circuit 291 compares the shifted reference signal 303 and the load signal. It provides an output which is low if the load signal is below the one volt reference and high if the load is above the reference. The output of the malfunction trip is inputted back to the integrator 213 as a start/stop control. The start/stop control allows the integrator 213 to integrate only during the time the load signal is below the one volt reference signal. In FIG. 13, the area integrated is that shown in cross-hatch. The output of the integrator 213 is applied to a pump-off trip circuit 251 which sets a threshold. The circuit is adjusted and calibrated such that when the well is pumping normally, the integrator output reaches the threshold during each stroke cycle. If the well pump off, the integrated area decreases until the integrated output no longer reaches the threshold. The well is then shut down following a time delay provided by delay 256.

By integrating only the area below the reference voltage 303 much better resolution is obtained in detecting pump-off. This is due to the fact that during pump off, it is the area below the reference 303 which changes while the area above the reference remains fairly constant. Thus, by operating only on the area that changes much better sensitivity to pump off is achieved.

The malfunction circuit 291 also acts to shut the well down if a malfunction occurs. It operates on the load range in that it compares peak load to minimum excursions. If the minimum excursion is not at least one volt below the peak load, a malfunction is indicated.

The peak picker 215 comprises an amplifier 223 having its noninverting input connected to conductor 221. Its output is connected to its inverting input by way of diodes 225 and 227 and to the capacitor C2.

If the voltage on the noninverting input of amplifier 223 is greater than the voltage on its inverting input, the output of the amplifier is high causing the diode 227 to be reversed biased. If the voltage on the noninverting input of the amplifier 223 is less than the voltage on the inverting input, the output of the amplifier 223 is low which causes the diode 227 to be forward biased. As the load approaches peak load, the voltage applied to the noninverting input of the amplifier 223 goes down. As peak load is reached, the voltage on the noninverting input of amplifier 223 becomes lower than the voltage on its inverting input and the output of the amplifier 223 goes low. This causes the diode 227 to be forward biased and allows the capacitor C2 to be charged to a new level representative of the new peak load. The capacitor C2 is charged until its charge is equal to the voltage on the noninverting input of the amplifier 223. As the load again decreases, the voltage on the noninverting input of the amplifier 223 increases and the output of the amplifier 223 goes high. This causes the diode 227 to be reversed biased and allows the capacitor C2 to hold its charge representative of the new peak load. If the next peak load does not reach the value held by the capacitor C2 the output of the amplifier 223 remains high thereby reverse biasing diode 227 and hence allowing the capacitor C2 to continue to hold its charge representative of the last peak load.

Operational amplifier 229 is employed as a high impedance buffer to prevent the capacitor C2 from discharging too fast. Resistor 231 causes capacitor C2 to discharge slightly thus ensuring that the potential on C2 is greater than the next minimum voltage input representing peak load. This results in the production of a pulse at each minimum value of the voltage from the amplifier 203 and hence at each peak load. These pulses are negative going pulses and are applied by way of conductor 233 to the integrator 213 and to the monostable multivibrator 219 by way of conductor 235.

The one volt level shifter comprises a constant current source, a scaling resistor and a high impedance buffer which are formed by resistors 311, 313, operational amplifier 315, transistor 317, resistors 319 and 321 and operational amplifier 323, the latter of which forms the buffer amplifier. The high impedance buffer maintains a buffered reference voltage to keep the rest of the circuitry from loading the voltage drop across resistor 321.

The integrator 213 comprises an operational amplifier 237 having its inverting input connected to the output of the amplifier 203 by way of the conductor 221 and its noninverting input connected to the output of operational amplifier 323 by way of conductor 239. A FET transistor 325 is located in series with the input to the integrator. The gate of this FET is tied through a resistor back to the output of the malfunction trip amplifier 327. The inputs to this malfunction amplifier 327 are provided from the load signal obtained at the input of the integrator 213 and from the one volt reference shift output provided from the buffer amplifier 323 of the one volt shifter.

The constant current source of the one volt shifter works as follows. A voltage divider provided by resistors 313 and 311 sets the input to the noninverting input of amplifier 315. The output of amplifier 315 drives the base of transistor 317, which is used to modulate the current. By monitoring voltage drop, resistor 319 is used to measure the current flow through transistor 317. The output of amplifier 315 forces transistor 317 to conduct enough current to set the voltage drop across resistor 319 at exactly the voltage drop across resistor 313. This is done as follows: If the current in transistor 317 is lower than necessary, the voltage drop across resistor 319 is less than the voltage on resistor 313. If this is the case, the inverting input to amplifier 315 is greater than the voltage input to the noninverting input. As a result, the output of amplifier 315 goes toward negative supply, increasing the current flow in transistor 317. This in turn causes the voltage drop across resistor 319 to increase. If the current through transistor 317 becomes greater than necessary, the voltage drop on resistor 319 is larger than the voltage drop on resistor 313 causing the inverting input to be lower than the noninverting output. As a result, the output of amplifier 315 goes toward positive supply which reduces the current flow through transistor 317. From this action, the current through transistor 317 must be maintained at a level which keeps the voltage drop on resistor 319 equal to the voltage drop of resistor 313. Since the voltage on resistor 313 is constant, the current through transistor 317 must be constant. Thus, there is provided a constant current source. This constant current then is passed through resistor 321, since resistor 321 is the only circuit path in which the current can flow. As described earlier, the constant current and constant resistance provides a constant voltage. This constant voltage is buffered by amplifier 323 to provide isolation from the other circuitry.

Once this new voltage reference has been derived, it is input to both the integrator 213, and to one input of the malfunction threshold amplifier 327. The malfunction amplifier compares this reference voltage to the load signal provided through conductor 221. Keep in mind that the load signal on conductor 221 is inverted from the load representation shown on FIG. 13. That is to say, once again, that peak load is represented by minimum voltage level on conductor 221. For the following description, reference will be made to the load as depicted in FIG. 13. The output of amplifier 327 provides a high level when the load signal is greater than the one volt reference. Conversely, it provides a low output when the load signal is below the reference. This output is fed back to the FET transistor 325 on the input to the integrator as a start/stop control. By using an N-channel FET, the input to the integrator is open circuited when the load is above the reference. Conversely, the FET provides short circuit to connect the input to the integrator when the load signal is below the reference. Thus, integration is only performed on load signals that are below the reference.

The integrator 213 also has a reset control input 241 comprising a FET. The output of the operational amplifier 223 is connected to the control input by way of conductor 233 and to the input of the monostable multivibrator by way of conductor 235. The pulses on the conductor 235 cause the monostable multivibrator to be actuated to produce positive going timing pulses which have a period greater than ½ of the stroke of the walking beam pumping unit. When the multivibrator is in its timing state, it will prevent secondary peaks from prematurely resetting the integrator. In some pumping operations, the secondary peaks approach the level of the main peak. When the monostable multivibrator is not in its timing state the negative pulses from the peak picker are not affected by the output of the monostable multivibrator and hence are applied to the integrator control 241 and reset the integrator. The value of the integrator 213 output at any time during a stroke cycle is representative of the amount of area under the curve of FIG. 13 below the reference 303 that has been accumulated up to that point in time.

The output of the integrator 213 is applied to a pump off trip 251 which sets a threshold. The threshold is set by a voltage divider 253 on the noninverting input of operational amplifier 255. The circuit is adjusted and calibrated such that when the well is pumping normally, the integrator output reaches the threshold during each stroke cycle. If the well pumps off, the integrated area decreases until the integrated output no longer reaches the threshold. The output of the pump off trip 251 is applied to a delay circuit 256 which comprises a RC timing circuit including resistor 257 and capacitor 259. Transistor 328 conducts only during the time the load is below the one volt reference 303. The pump off time delay 256 times only when the transistor 328 is conducting and hence only when the load signal is below the one volt reference 303. If the integrator output reaches the threshold, a positive pulse is produced by the operational amplifier 255 which renders conductive a transistor 261 which allows the capacitor 259 to discharge to ground and hence resets the capacitor. When this occurs, the control output circuit 263 is rendered inactive whereby the pump continues pumping. If the output of the integrator fails to reach the threshold, the operational amplifier 255 does not produce a positive pulse whereby the transistor 261 remains nonconductive. The capacitor 259 thus continues to charge until it reaches a threshold set by voltage divider 265 which is coupled to the inverting input of operational amplifier 267. When this threshold is exceeded, the amplifier 267 produces a positive pulse which turns on SCR 268 which in turn renders a transistor of downtimer 269 conductive. The downtimer 269 is not shown in FIG. 12 but is similar to the downtimer 68 of FIGS. 1 and 2 and is connected to the SCR 268 by way of conductor 270. This transistor is similar to that shown at 157 in the downtimer of circuit 68 of FIG. 2. When this occurs, a relay similar to relay 159 of FIG. 2 is energized to shut down the motor. The downtimer will time for a certain period and when it times out it will open the transistor circuit and stop the current flow through the SCR 268 which allows the well to start running again. The control output also is applied by way of conductor 273 to the pump up timer 275 which also comprises a timing circuit including capacitor 277 and one of resistors 279. When the RC timing circuit is below a threshold set by voltage divider 281 coupled to the noninverting input of operational amplifier 283, the amplifier 283 produces a low output which holds the output of the integrator 213 down below the threshold set by voltage divider 253 for the duration of the pump up time. After the pump up timer expires a stablized pumping condition provides enough integrated area accumulated by the integrator 213 to reach the threshold to allow the system to continue pumping.

The pump up timer expires when the voltage on capacitor 277 approaches the level of 281 which causes transistor 370 to conduct thereby shorting the noninverting input of amplifier 283 to positive supply. This causes the output of amplifier 283 to go high.

Circuitry 291–293 compares the load signal to the one volt reference. The RC timing circuit formed by resistor 371 and capacitor 372 times continuously. Each time the load signal goes below the one volt reference, transistor 328 conducts to discharge the capacitor 372 thereby resetting the malfunction time delay. If the load signal fails to cross the one volt reference the timing circuit 371 and 372 charges to the potential at point 373 at which time amplifier 374 goes high rendering transistor 375 conductive and energizes relay 376 to shut down the well and indicate a malfunction. If the load range defined as the difference between peak and minimum reduces below one volt a malfunction has occured.

We claim:

1. A system for controlling an electric motor employed for driving a walking beam type pumping unit used for pumping fluid from a well wherein the amplitude of the current drawn by the motor normally has two minimum peak values during each stroke cycle of the walking beam, said system comprising:
   measuring means for measuring the amplitude of the current drawn by the motor during each stroke cycle of the walking beam,
   detector means coupled to the output of said measuring means for producing a pulse at the minimum peaks of the current amplitude during each stroke cycle,
   integrator means having a first input connected to the output of said measuring means for integrating the current measured by said measuring means during each stroke cycle,
   pulse generating means coupled to the output of said detector means and responsive to alternate pulses from said detector means for generating a control pulse during each stroke cycle having a time period greater than ½ of the time period of each stroke cycle,
   said integrator means having a reset input,
   means for applying the output of said detector means to said reset input,
   means for applying the output of said pulse generator means to said reset input to allow only alternate ones of said pulses from said detector means to reset said integrator means to allow said integrator means to integrate the current amplitude during each stroke cycle, and
   means including threshold means for sensing the output of said integrator means during each stroke cycle and for producing a control signal for shutting off the motor if the integrator output fails to reach a predetermined threshold during each stroke cycle and representative of normal pumping conditions.

2. The system of claim 1 wherein:

said detector means comprises:
 capacitor means for storing the previous minimum value of the output of said measuring means, and
 means coupled to the output of said measuring means and to said capacitor means for applying a charge to said capacitor means if the minimum value of the current decreases to a lower value than the previous minimum value, said integrator means comprises:
 a reference input, and
 means for applying the value of the charge stored in said capacitor means to said reference input to allow said integrator means to employ the value of the charge stored in said capacitor means as a base from which integration is carried out.

3. A system for controlling an electric motor employed for driving a walking beam type pumping unit used for pumping fluid from a well, said system comprising:

measuring means for measuring the amplitude of the load of said pumping unit during each stroke cycle of the walking beam, detector means coupled to the output of said measuring means for producing a pulse at the maximum peak of the load amplitude during each stroke cycle, storage means for storing a value representative of peak load, reference means for setting a reference level at a predetermined value below the peak load stored by said storage means, integrator means having an input coupled to the output of said measuring means, control means responsive to the output of said reference means and to the output of said measuring means for allowing said integrator means to integrate the load measured by said measuring means only when it is below said reference level, pulse generating means coupled to the output of said detector means and responsive to pulses from said detector means for generating a control pulse during each stroke cycle having a time period greater than ½ of the time period of each stroke cycle, said integrator means having a reset input, means for applying the output of said detector means to said reset input, means for applying the output of said pulse generator to said reset input to allow only said pulses from said detector means to reset said integrator means to allow said integrator means to integrate during each stroke cycle, and means including threshold means for sensing the output of said integrator means during each stroke cycle and for producing a control signal for shutting off the motor if the integrator means output fails to reach a predetermined threshold during each stroke cycle and representative of normal pumping conditions.

4. The system of claim 3 wherein:

said detector means comprises:
 capacitor means for storing the previous maximum value of the output of said measuring means, and
 means coupled to the output of said measuring means and to said capacitor means for applying a charge to said capacitor means if the maximum value of the load increases to a higher value than the previous maximum value.

* * * * *